T. G. Boone,
Windlass,
Nº 8,442.
Patented Oct. 21, 1851.
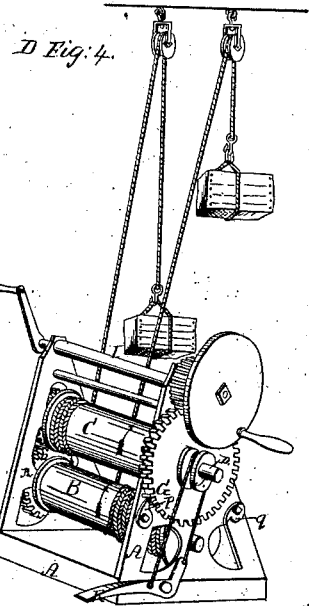
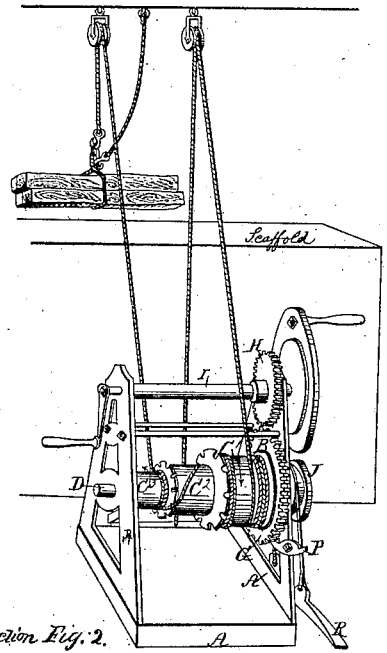
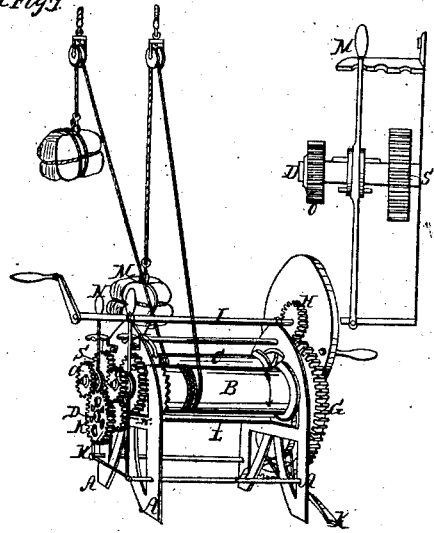
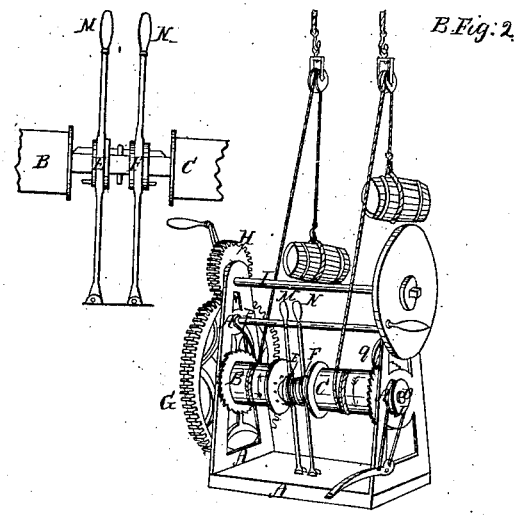

UNITED STATES PATENT OFFICE.

THOMAS G. BOONE, OF BROOKLYN, NEW YORK.

SHIP'S WINCH.

Specification of Letters Patent No. 8,442, dated October 21, 1851.

*To all whom it may concern:*

Be it known that I, THOMAS G. BOONE, of the city of Brooklyn, county of Kings, and State of New York, have invented a new and important improvement in ship-winches, whereby when an article has been by it hoisted I make the lowering motion of the same to apply in its descent to aid in the elevation of the next object, which being hoisted, in connection with the descent of the former, has its weight or gravity in whole or in part counterbalanced thereby; and I do declare that the following is a faithful and exact description.

The nature of my invention consists in the investing of the power of the lowering motion of one load or burden, so as to make it aid in the hoisting of another, thereby greatly facilitating the loading and unloading of shipping, making the labor easier, and the despatch greater.

To enable others skilled in the art to make and use my invention I will proceed to describe its construction, and operation.

Figure 1: A is a metallic frame. B, and C, are two windlasses. D, and *d*, are two windlass shafts; on one end of which are placed on each, and running loose thereon, one of each of the spur wheels, O, O and S, S, in which are provided recesses for the clutch gear of clutch-wheels E, F. E, F, are clutch wheels having slots for lever shafts, M, N, and sliding lengthwise on their respective shafts, but secured to its rotary direction, each by a feather in its shaft on which it is fitted to slide. G is a spur wheel on shaft L. H is a pinion geering thereinto and placed on crank shaft I. I, is a crank shaft having a crank on each end, one of which is formed by having a handle on the fly wheel, for greater convenience. J, is a brake on driving shaft L, on which shaft are two fast pinions of different sizes, K, and L, so as to communicate greater or less speed to their respective match wheels, O, O and S S. M and N are two small shafts having one end working in a joint or fulcrum; the center into the slot of its clutch wheel, E or F, so as to move them into, or out of gear, the upper end being a handle to work them by. O O and S S are four spur wheels, loose on shafts D and *d*, S, S being difficult to take off the shaft by reason of the feather that secures E and F to the rotation of the shafts D *d*, but O, O, can be readily taken off with the spur pinion K, and other suitable spare wheels put on, adapted to run in contra connection with K and S S any proportional change or speed required. If K, have 26 cogs, while O O have 20 each, and if K, have 20 cogs while S, S, have 26 each, the windlass geared by its clutch to O would hoist or lower about 69 or 70 per cent. faster than the one geared with S, while so working together. P and *q* are two pawls working into ratchet wheels, formed onto their respective windlasses, capable of being engaged, or disengaged and suspended at pleasure. Now if the crank shaft I, be put in motion, and the clutches E and F, disengaged, the wheels O O K and K S S will be in motion, but the windlasses B and C, and clutches E and F, will be still. If windlass B have a rope attached to it passing over the ship's blocks, and descending as a single whip, or fall, and it be attached to a burden, the operator would have the choice of purchase, as he might choose to move the lever M, from a neutral position into gear, with O, or with S, O representing the smallest spur wheel, and the greatest speed. Each windlass should wind up in the direction of its dart, and when both are in motion they turn in the same direction, one windless winding up as the other unwinds, B, being turned in the direction of its dart, winding on its outer side, and raising its burden to a desired height where the pawl P would secure it suspended at rest. If then C be rigged and geared in like manner, and the pawl P, raised, a like burden being attached, to the fall from C, B could not unwind and lower, without C, winding up or hoisting; and if arranged to lower an equal weight a distance sufficiently greater than that to be raised to overcome the friction, and accomplish the elevation it would do so, or merely aid therein, as otherwise applied.

Fig. 2, is a different arrangement of the same principle. A is a metal frame. B and C, are two windlasses moving like a swift on their axle D. D is a main windlass shaft on which are the two barrels or trundles, being windlasses however made, marked B and C, each provided with a movable clutch, or gear wheel, E and F, provided and arranged to clutch or couple therewith at the end nearest approximating thereto—each windlass provided at its other end—with ratch and pawl, the pawls marked P and Q (as in Fig. 1).

E and F are two clutch wheels sliding on a feather and operating thereon (as in Fig. 1) (like letters referring to like parts). G, is a spur wheel on shaft D. H is a pinion gearing thereinto, and placed on the shaft I. I is a crank shaft with crank and fly wheel, as on Fig. 1. J is a brake on shaft D, the ropes or chains passing in the usual manner over the slips blocks, or pulleys, as single falls are attached to the windlasses in a contrawise direction, so that on turning the shaft D while they are in connection and in motion, the one unwinds lowering, while the other winds up or hoists, each reversing its action with the reversing of the motion of D. M, and N are levers or shafts working their respective clutches into, and out of gear, as in Fig. 1. Each windlass has a ratch and pawl—the pawls are marked P and $q$ to hold the burden suspended when the windlass is disengaged from the shaft, so that when the power of the lowering motion of one burden has aided in a sufficient elevation of another, and there is yet more lowering to accomplish, the hoisted burden can be suspended as aforesaid, and the further lowering be accomplished with facility by the brake.

Fig. 3 is another arrangement of the same principle, wherein I have spare windlasses, or that which is equivalent thereto, on one shaft—that is I perform the same action by having separate spaces of barrel, or windlass roller varying in diameter, each acting as a windlass, and each of sufficient dimensions to supply a sufficient proportion of fall for hoisting and lowering, according to the purchase afforded, by the proportional distances to which it is arranged. A, is the frame work. D is the driving or windlass shaft, with the windlass, or windlasses thereon, divided into windlass spaces, in number and of diameter adapted to the work required. This figure represents one having 3 spaces, each separated by a flange, and having one on each side or end of the space, perforated as required for fastening of the rope or fall. Each windlass or space might have a separate fall with facilities to fasten the loose end, when not in use; but I would prefer the plan of rigging hereinafter described. The largest windlass, or space, I prefer to be about 24 inches diameter, and about 12 inches long. This diameter, with one inch added for diameter of rope, will give about 75 inches, or 6¼ feet length to a revolution. 12 inches long, would give full 9 turns of a 4 inch rope $a$ (3¾ inches circumference is sufficient for most cases) making over 56 feet in the contents, affording 2 falls of 28 feet each on first wind, which is sufficient for most ships. Some of the largest class ships might require about 34 feet for the depth of hold, but as each fall winds from the flange toward the center, and one must be unwound to be used, before the other can be needed, there will always be sufficient windlass room in the middle, when working on even purchase from the windlass. B is that part of this first space which having the fall fastened, to the first flange is calculated to wind on its upper surface when turned in the direction of its dart. C' is that part of the same space where having the fall fastened to 2d flange, it is calculated to wind onto its lower surface toward B, when turned in an opposite direction, as indicated by its dart. $C^2$ is that windlass on space next preferred to be 18 inches diameter, and 9 inches long. It is ¾ the diameter, because it is calculated to be used as a counterpart to the greater distance; when on the less, or about a ¾ distance of hoisting, or lowering is required; consequently a ¾ length of rope only would be required, and 9 inches length on that diameter all that would be necessary as to length of fall. Flange 2 has notches or recesses down about to the band or surface $C^1$, adapted to hold the fall from further sliding, when any part of it is taken from $C^1$, to $C^2$. In this way the same fall will most conveniently supply any necessary succession of windlasses or spaces as required; they needing less fall, as they are adapted to less distance C winding always on each windlass or space, on its lower surface, when turned in the same direction indicated on $C^1$, $C^2$ and $C^3$. $C^3$, is the windlass or space next calculated 12 inches diameter, 9 inches long. It is ½ the diameter of the 1st space, as for a ½ distance adaptation, for the same reasons assigned for $C^2$, as being a ¾ distance adaptation, and slots or recesses for the change of fall in flange 3, as in flange 2, as described. In this way the falls can be conveniently lengthened or shortened, by adjusting them in the notches of the flanges to the length required in working a part distance, in which case the burden in some way must be transferred from the hoisting to the lowering fall, or be lowered on deck by one to be transferred at convenience to the other. As a most convenient measure, a scaffold is recommended, especially for single casks, where one or two may be kept in transit between the hoisting and lowering process. But where packages are slung, much loss of power often occurs from the taking up of slack, compression of package, and straightening of sling, which beside the inconvenience of re-slinging while on the scaffold is a loss of both time and power by this, or any other process. A sling rigged with two or three rings or thimbles might obviate most of this, by using one or two spare blocks—one at the place of slinging, having a hook to insert in the upper thimble, to straighten up the package, by the man who might hook the main fall in the other thimble—by which it would be taken to one end of the upper scaffold. A small block or fall, nearly over the middle of the scaffold, or a rope suspended there with a hook which might be inserted in one of the rings called thimbles—by which it could be easily taken, in its package form, and conveyed to the other fall at the other end of the scaffold, to be hooked onto and lowered in its turn with convenience safety, and dispatch; each windlass or space doing its own hoisting, or its own lowering—each acting on its reciprocating principle, as occasion might require. This plan obviates much of the use of gearing, and requires only a reverse motion to let out warp or fall and take up the slack to the distance required. The fall working the greatest distance having consequently the greatest purchase to move the winch, is the hardest to be managed by the brake when not in any way, or part, counterbalanced; therefore for facility the burden should generally be first disengaged therefrom, even if the other should require a backward action in order to be deposited. Thus if the pawl B, be first attached to a burden to be raised and suspended by its pawl, stop or check thereto adapted, while the pawl C³ should be attached, it would require about twice the effort, or power to raise the burden, by the fall B, to attach C³ to its burden, than it would to attach the burden of B if C³ be first attached, and raised, and suspended by the pawl, stop or check thereto adapted. Reversely so in detaching, as one cannot lower without the other hoists; the burden of the shortest fall being more easily under the control of the brake should generally be the last disengaged. G is a spur wheel, and J, is a brake on shaft D, H, I, R, same as in other descriptions; P, q a pawl so weighted in itself, and placed as to act either way as a pawl or stop on being turned over as required. A weight to over haul and secure the descent of the unburdened fall, after it has hoisted, or to sufficiently aid therein, is necessary in use of the method where the burden is transferred from the hoisting to the lowering fall, sufficiently elevated on the fall above the hook, as not to have its weight arrested until it has rendered its use, in overhauling the winch, and falls aforesaid. The blocks in which the falls work may be suspended by a block and fall, capable of hoisting and lowering them as in many cases, a convenient method of shortening or lengthening the falls.

Fig. 4 is another arrangement of the same principle—like letters signifying the same things, to wit: A is a frame. B and C, are two windlasses rigged precisely as described in Figs. 1 and 2 for reciprocal action and like investment of power. G is a spur wheel on shaft of G'. H is a pinion gearing thereinto and placed on crank shaft I. I is a crank shaft, arranged and provided same as in previous description. J being brake attached to spur wheel G, which gears with pinion H, as described; on other end of shafts B and C, are two gear wheels O and K capable of being replaced, or changed by spare wheels adapted to give an even or such disproportionate speed, the one to the other as may be required: provided with pawls P and q and adapted by such changes of relative speed to precisely the same reciprocating action as described of Fig. 3. But turning contrawise the one from the other, each winds up in the direction of its dart. The fall from neither can lower except the other hoists, and vice versa, as required.

Having described my invention, its mode of construction and operation I do not claim the rigging of a winch or windlass with counterfalls for the hoisting and lowering of burdens on the counterpoise principle, at whatever relative distance of hoisting and lowering it may be fixed, simply as such; but

I claim—

1. The combination in a ship winch of the principle of adjustability with the principle of counterpoise; wherby I am enabled to vary the relative distances of the hoisting to that of the lowering motion so as to adapt its action to various changes of the relative distances of the hoisting to that of the lowering as required in the lading and unlading of vessels.

2. I claim also therewith the principle of using a hoisting in connection with a lowering fall so that the burden is hoisted by one fall and lowered by the other, instead of interchanging the falls so that each load or parcel is both raised and lowered by the same fall as has been practiced in other counterpoise machines; by which means my winch is more convenient to use than it would otherwise be when the hoisting and lowering distances are dissimilar.

3. I claim a fall or chain and hook suspended over the deck or scaffold working as a suspension chain and medium of transfer from the hoisting to the lowering fall of a ship winch whereby I am enabled as described to transfer packages or burdens in sling from the hoisting to the lowering fall without reslinging or otherwise resting them.

THOMAS G. BOONE.

In presence of—
W. F. UNDERHILL,
EDWD. C. MOOREHOUSE.